United States Patent Office 2,703,325
Patented Mar. 1, 1955

2,703,325

PREPARATION OF 5-BENZYLOXYTRYPTAMINES

Merrill E. Speeter, Kalamazoo, Mich., assignor to The Upjohn Company, Kalamazoo, Mich., a corporation of Michigan No Drawing. Application December 6, 1951, Serial No. 260,315

24 Claims. (Cl. 260—319)

The present invention relates to novel organic compounds, and is more particularly concerned with a novel method for the production of 5-benzyloxytryptamines and with the novel products thus produced. This application is a continuation-in-part of my copending application, Serial No. 257,961, filed November 23, 1951.

The compounds of the present invention may be represented by the formula:

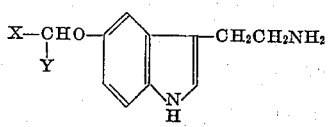

wherein X represents phenyl, and wherein Y represents alkyl, cycloalkyl, phenyl, or hydrogen. Within the scope of the term "phenyl" are included substituted phenyl radicals, e. g., alkylphenyl, cycloalkylphenyl, alkoxyphenyl, halophenyl and aralkylphenyl.

It is an object of the present invention to provide new and useful organic compounds, the 5-benzyloxytryptamines. An additional object is the provision of a novel process for the preparation of the new compounds. Other objects of the invention will be apparent to those skilled in the art to which the invention pertains.

The novel compounds of the present invention are important intermediates in the preparation of serotonin [J. Biol. Chem. 180, 961 (1949)], a powerful vasoconstrictor. The novel 5-benzyloxytryptamines may be converted to the desired serotonin, as more fully disclosed in my co-pending application, Serial Number 265,045, filed January 4, 1952, now abandoned. The novel compounds may also be used as hemostatic agents and in addition possess vasoconstrictor qualities per se.

According to the method of the present invention, the 5-benzyloxytryptamines are prepared by the treatment of 5-benzyloxy-3-indoleacetonitriles with a reducing agent to convert the 5-benzyloxy-3-indoleacetonitriles to the desired 5-benzyloxy-3-indoleethylamines, or, as more briefly named, the 5-benzyloxytryptamines.

The compounds which are used as starting materials for the method of the present invention are the 5-benzyloxyindoles, which may be prepared according to the method of Burton and Stoves [J. Chem. Soc. (London) 1937, 1726]. The preparation of these compounds by the same and different methods is more fully disclosed in my co-pending applications, Serial Number 257,961, filed November 23, 1951, and Serial Number 273,149, filed February 23, 1952. The preparation of the 5-benzyloxy-3-indoleacetonitriles, which are also useful starting materials, is more fully disclosed in my co-pending application, Serial Number 257,961, filed November 23, 1951.

The preparation of the 5-benzyloxy-3-indoleacetonitriles is accomplished by reacting a 5-benzyloxyindole with a Grignard reagent and thereafter reacting the resulting 5-benzyloxyindolemagnesium halide with a haloacetonitrile to produce the desired 5-benzyloxy-3-indoleacetonitrile. For the Grignard step, a great many Grignard reagents are satisfactory, among them being those prepared from alkyl halides, cycloalkyl halides, aryl halides, and aralkyl halides, the lower-alkyl halides, such as methyl iodide and ethyl bromide, being preferred. The Grignard reaction is as usual carried out in the presence of an organic solvent, with diethyl ether and tetrahydrofuran being preferred, although other well-known organic solvents, suitable for use in Grignard reactions, such as benzene, anisole, or toluene, can also be employed. The preparation of the Grignard reagent of the starting 5-benzyloxyindole is usually conducted at the boiling point of the solvent employed, although other temperatures between about zero and 150 degrees centigrade, preferably between about zero and 100 degrees centigrade, may also be used, a longer reaction period being required at the lower temperatures. The resulting 5-benzyloxyindolemagnesium halide is then reacted with a haloacetonitrile, such as chloroacetonitrile, iodoacetonitrile, or bromoacetonitrile, with chloroacetonitrile being preferred. The same organic solvent as employed for the Grignard step is usually employed, although others may be used if desired. The temperature range for the reaction is usually between about zero and 100 degrees centigrade, with the reaction ordinarily being conducted at the boiling point of the solvent employed. After refluxing for a period of about one to five hours, the resulting 5-benzyloxy-3-indoleacetonitrile is separated by conventional procedure, which, for example, may involve a mild hydrolysis, as with dilute acetic acid, to form a water layer and an ether layer. The ether layer containing the 5-benzyloxy-3-indoleacetonitrile may be separated and dried to give an ethereal solution of the 5-benzyloxy-3-indoleacetonitrile. From this solution the desired 5-benzyloxy-3-indoleacetonitrile may be obtained in high purity by evaporation or solvent removal according to other conventional procedures.

The 5-benzyloxy-3-indoleacetonitriles are then reduced to the 5-benzyloxytryptamines, and for this purpose a great many reducing agents are suitable. Representative reducing agents include metal hydrides, such as lithium aluminum hydride, lithium borohydride, and the like, with lithium aluminum hydride being preferred. The reduction of the 5-benzyloxy-3-indoleacetonitriles can also be accomplished catalytically, in which case platinum is the preferred catalyst. The reduction is usually conducted in an organic solvent, with ether being preferred, although other well-known solvents such as isopropyl ether, tetrahydrofuran, N-methylmorpholine, dioxane, and the like may also be used. The reduction of the 5-benzyloxy-3-indoleacetonitriles is usually accomplished at the boiling point of the solvent used, although other temperatures between about zero and 100 degrees centigrade may be employed, and preferably zero to 65 degrees centigrade when lithium aluminum hydride is the reducing agent utilized. After a reaction period of from about one to five hours, the 5-benzyloxytryptamine free bases are readily obtained as heavy non-crystalline oils by hydrolyzing the reaction product with aqueous ether followed by dilute alkali, extracting the alkaline residue with ether, combining the ether extracts, and concentrating and evaporating the solvent. Other conventional procedures for the hydrolysis may be used if desired, and other organic solvents may be used in place of ether. A preferable manner of isolation, however, resides in reacting the free base, without isolation, with a stoichiometric quantity of an acid, such as hydrochloric, to form the 5-benzyloxytryptamine acid addition salt. In this manner, the free base may be separated as its crystalline salt, e. g., hydrochloride, which usually precipitates from the solution. Alternatively, the free base may be isolated by removal of solvent and admixed with a stoichiometric quantity of an acid, e. g., hydrochloric, hydrobromic, sulfuric, acetic, tartaric, citric, picric, or the like, to form the corresponding acid addition salt of the 5-benzyloxytryptamine used, and the 5-benzyloxytryptamine acid addition salt precipitate, thus obtained, may be removed by filtration and utilized as such, or the resulting acid addition salt precipitate may be further purified, if desired, by recrystallizing from alcohol-water solutions such as methanol-water, ethanol-water, isopropanol-water, and the like with ethanol-water being preferred.

The following examples are given to illustrate the process and products of the present invention, but are not to be construed as limiting.

PREPARATION 1.—5-BENZYLOXY-3-INDOLEACETONITRILE

To a Grignard reagent prepared from 4.25 grams (0.03 mole) of methyl iodide and 2.0 grams of magnesium in 200 milliliters of ether was added a solution of 5.5 grams (0.025 mole) of 5-benzyloxyindole in 200 milliliters of ether. After heating under reflux for thirty minutes, the mixture was cooled in an ice-bath and a solution of three grams (0.04 mole) of freshly-distilled chloroacetonitrile in 100 milliliters of ether was added thereto. The mixture was heated vigorously under reflux for two and one-half hours, cooled and hydrolyzed by the addition of a solution of ten milliliters of glacial acetic acid and ninety milliliters of water. The ether layer was separated and the aqueous layer extracted with several portions of ether. The combined ether solutions were washed successively with water, sodium carbonate solution and water. After drying over potassium carbonate for 24 hours, the ethereal solution of 5-benzyloxy-3-indoleacetonitrile was used directly in the preparation of 5-benzyloxytryptamine. Alternatively, the 5-benzyloxy-3-indoleacetonitrile can be separated by evaporation or other conventional procedure and the isolated material used in the preparation of 5-benzyloxytryptamine.

In the same manner numerous other 5-benzyloxy-3-indoleactonitriles, including 5-alkylbenzyloxy-3-indoleacetonitriles, 5-cycloalkylbenzyloxy-3-indoleacetonitriles, 5-halobenzyloxy-3-indoleacetonitriles, 5-alkoxybenzyloxy-3-indoleacetonitriles, 5-aralkylbenzyloxy-3-indoleacetonitriles, 5-benzhydryloxy-3-indoleacetonitrile, 5-(alpha-alkyl-benzyloxy)-3-indoleacetonitriles, 5-(alpha-cycloalkyl-benzyloxy)-3-indoleacetonitriles, 5-(halobenzhydryloxy)-3-indoleacetonitriles, 5-(dihalobenzhydryloxy)-3-indoleacetonitriles, 5-(alpha-alkyl-alkylbenzyloxy)-3-indoleacetonitriles, 5-(dialkoxybenzhydryloxy)-3-indoleacetonitriles, 5-(dialkylbenzhydryloxy)-3-indoleacetonitriles, 5-(dicycloalkylbenzhydryloxy)-3-indoleacetonitriles, and 5-(diaralkylbenzhydryloxy)-3-indoleacetonitriles are prepared from 5-alkylbenzyloxyindoles, e. g., 5-(para-methylbenzyloxy)-indole, 5-cycloalkylbenzyloxyindoles, e. g., 5-(para-cyclohexylbenzyloxy-indole, 5-halobenzyloxyindoles, e. g., 5-(para-chlorobenzyloxy)-indole, 5-alkoxybenzyloxyindoles, e. g., 5-(para-methoxybenzyloxy)-indole, 5-aralkylbenzyloxyindoles, e. g., 5-(para-benzylbenzyloxy)-indole, 5-benzhydryloxy-indole, 5-(alpha-alkyl-benzyloxy)-indoles, e. g., 5-(alpha-methyl-benzyloxy)-indole, 5-(alpha-cycloalkyl-benzyloxy)-indoles, e. g., 5-(alpha-cyclopentylbenzyloxy)-indole, 5-(halobenzhydryloxy)-indoles, e. g., 5-(para-chlorobenzhydryloxy)-indole, 5-(dihalobenzhydryloxy)-indoles, e. g., 5-(para,para'-dichlorobenzhydryloxy)-indole, 5-(alpha-alkyl-alkylbenzyloxy)-indoles, e. g., 5-(alpha-propyl-para-methylbenzyloxy)-indole, 5-dialkylbenzhydryloxy)-indoles, e. g., 5-(para,para'-dimethylbenzhydryloxy)-indole, 5-(dialkoxybenzhydryloxy)-indoles, e. g., 5-(para,para'-dimethoxybenzhydryloxy)-indole, 5-(dicycloalkyl-benzhydryloxy)-indoles, e. g., 5-(para,para'-dicyclohexylbenzhydryloxy)-indole, 5-(diaralkylbenzhydryloxy)-indoles, e. g., 5-(para,para'-dibenzylbenzhydryloxy)-indole, respectively, in place of the 5-benzyloxyindole which is used to prepare the 5-benzyloxy-3-indoleacetonitrile of the above preparation.

Example 1.—5-benzyloxytryptamine and acid addition salts thereof

An ether solution of 5-benzyloxy-3-indoleacetonitrile, obtained in the above preparation, was added to a solution of 3.7 grams (0.1 mole) of lithium aluminum hydride in 400 milliliters of anhydrous ether. The mixture was heated under reflux for one hour and hydrolyzed by the addition of 500 milliliters of ether saturated with water followed by fifty milliliters of five per cent sodium hydroxide solution. The ether layer was decanted and the aqueous alkaline residue was extracted with several 300-milliliter portions of ether. The ether solutions of the free 5-benzyloxytryptamine were combined and washed with dilute sodium hydroxide solution and with water, whereafter the free 5-benzyloxytryptamine was shaken with an equimolecular proportion of five per cent hydrochloric acid. A crystalline precipitate of 5-benzyloxytryptamine hydrochloride separated and was removed by filtration; yield 3.3 grams (44 per cent based on starting 5-benzyloxyindole). After two recrystallizations from ethanol and water, the 5-benzyloxytryptamine hydrochloride melted at 248–250 degrees centigrade with decomposition.

Analysis.—Per cent calculated for $C_{17}H_{19}ClN_2O$: C, 67.42; H, 6.32; Cl, 11.71; N, 9.20. Found: C, 67.26; H, 6.34; Cl, 11.78; N, 9.20.

Example 2.—5-(para-methylbenzyloxy)-tryptamine and acid addition salts thereof In essentially the same maner as disclosed in Example 1, 5-(para-methylbenzyloxy)-tryptamine and its hydrochloride are prepared by reacting lithium aluminum hydride with 5-(para-methylbenzyloxy)-3-indoleacetonitrile in place of the 5-benzyloxy-3-indoleacetonitrile used in Example 1.

In the same manner, the following 5-alkylbenzyloxytryptamines are prepared by reacting lithium aluminum (para-propylbenzyloxy)-tryptamine, 5-(para-isopropyl-doleacetonitrile: 5-(meta-ethylbenzyloxy)-tryptamine, 5-(para-propylbenzyloxy)-tryptamine, 5-(para-isopropylbenzyloxy)-tryptamine, 5-(orthobutylbenzyloxy)-tryptamine. 5-(para-amylbenzyloxy)-tryptamine, 5-(para-hexylbenzyloxy)-tryptamine, 5-(para-heptylbenzyloxy)-tryptamine, 5-(para-octylbenzylbenzyloxy)-tryptamine, and the like.

Example 3.—5-(para-benzylbenzyloxy)-tryptamine and acid addition salts thereof In essentially the same manner as disclosed in Example 1, 5-(para-benzylbenzyloxy)-tryptamine and its hydrochloride are prepared by reacting lithium aluminum hydride with 5-(para-benzylbenzyloxy)-3-indoleacetonitrile in place of the 5-benzyloxy-3-indoleacetonitrile of Example 1.

In the same manner, the following 5-aralkylbenzyloxytryptamines are prepared by reacting lithium aluminum hydride and the appropriate 5-aralkylbenzyloxy-3-indoleacetonitrile: 5-(meta-phenethylbenzyloxy)-tryptamine, 5-(para-phenylpropylbenzyloxy)-tryptamine, 5-(ortho-phenylbutylbenzyloxy)-tryptamine, 5-(para-phenylamylbenzyloxy)-tryptamine, 5-(para-phenylhexylbenzyloxy)-tryptamine, 5-(para-phenylheptylbenzyloxy)-tryptamine, 5-(para-phenyloctylbenzyloxy)-tryptamine, and the like.

Example 4.—5-(para-methoxybenzyloxy)-tryptamine and acid addition salts thereof In essentially the same manner as disclosed in Example 1, 5-(para-methoxybenzyloxy)-tryptamine and its hydrochloride are prepared by reacting lithium aluminum hydride with 5-(para-methoxybenzyloxy)-3-indoleacetonitrile in place of the 5-benzyloxy-3-indoleacetonitrile of Example 1.

In the same manner, the following 5-alkoxybenzyloxytryptamines are prepared by reacting lithium aluminum hydride and the appropriate 5-alkoxybenzyloxy-3-indoleacetonitrile: 5-(meta-ethoxybenzyloxy)-tryptamine, 5-(para-propoxybenzyloxy)-tryptamine, 5-(para-butoxybenzyloxy)-tryptamine, 5-(para-amyloxybenzyloxy)-tryptamine, 5-(para-hexoxybenzyloxy)-tryptamine, 5-(para-heptoxybenzyloxy)-tryptamine, 5-(para-octoxybenzyloxy)-tryptamine, and the like.

Example 5.—5-benzhydryloxytryptamine and acid addition salts thereof

In essentially the same manner as disclosed in Example 1, 5-benzhydryloxytryptamine and its hydrochloride are prepared by reacting lithium aluminum hydride with 5-benzhydryloxy-3-indoleacetonitrile in place of the 5-benzyloxy-3-indoleacetonitrile of Example 1.

By substituting the corresponding 5-(halobenzhydryloxy)-3-indoleacetonitrile for the 5-benzhydryloxy-3-indoleacetonitrile of Example 5, 5-(para-chlorobenzhydryloxy)-tryptamine, 5-(para,para'-dichlorobenzhydryloxy)-tryptamine, and the like are prepared.

Example 6.—5-(para-cyclohexylbenzyloxy)-tryptamine and acid addition salts thereof In essentially the same manner as disclosed in Example 1, 5-(para-cyclohexylbenzyloxy)-tryptamine and its hydrochloride are prepared by reacting lithium aluminum hydride with 5-(para-cyclohexylbenzyloxy)-3-indoleacetonitrile in place of the 5-benzyloxy-3-indoleacetonitrile of Example 1.

In the same manner, the following 5-cycloalkylbenzyloxytryptamines are prepared by reacting lithium aluminum hydride and the appropriate 5-cycloalkylbenzyloxy-3-indoleacetonitrile: 5-(para-cyclopentylbenzyloxy) - tryptamine, 5 - (meta-cyclohexylbenzyloxy) - tryptamine, and the like.

*Example 7.—5-(para-chlorobenzyloxy)-tryptamine and acid addition salts thereof*

In essentially the same manner as disclosed in Example 1, 5-(para-chlorobenzyloxy)-tryptamine and its hydrochloride are prepared by reacting lithium aluminum hydride and 5-(para-chlorobenzyloxy)-3-indoleacetonitrile in place of the 5-benzyloxy-3-indoleacetonitrile of Example 1.

In the same manner, the following 5-halobenzyloxytryptamines are prepared by reacting lithium aluminum hydride and the appropriate 5-halobenzyloxy-3-indoleacetonitrile: 5-(meta-bromobenzyloxy)-tryptamine, 5-(para-iodobenzyloxy)-tryptamine, and the like.

*Example 8.—5-(alpha-methyl-benzyloxy)-tryptamine and acid addition salts thereof*

In essentially the same manner as disclosed in Example 1, 5-(alpha-methylbenzyloxy)-tryptamine and its hydrochloride are prepared by reacting 5-(alpha-methyl-benzyloxy)-3-indoleacetonitrile with lithium borohydride.

By substituting the corresponding 5-(alpha-alkyl-benzyloxy)-3-indoleacetonitriles for the 5-(alpha-methyl-benzyloxy)-3-indoleacetonitrile of Example 8, 5-(alpha-ethyl - benzyloxy) - tryptamine, 5-(alpha - propyl - benzyloxy) - tryptamine, 5 - (alpha-isopropyl - benzyloxy) - tryptamine, 5-(alpha-octyl-benzyloxy)-tryptamine, and the like are prepared.

*Example 9.—5-(alpha-cyclohexyl-benzyloxy)-tryptamine and acid addition salts thereof*

In essentially the same manner as disclosed in Example 1, 5-(alpha-cyclohexyl-benzyloxy)-tryptamine and its hydrochloride are prepared by reacting lithium borohydride with 5-(alpha-cyclohexyl-benzyloxy)-3-indoleacetonitrile.

In the same manner, 5-(alpha-cyclopentyl-benzyloxy)-tryptamine is prepared by the reaction of lithium borohydride and 5-(alpha-cyclopentyl-benzyloxy)-3-indoleacetonitrile.

Other representative 5-benzyloxytryptamines and their acid addition salts which may be prepared in this manner are 5-(alpha-alkyl-alkylbenzyloxy)-tryptamines, e. g., 5-(alpha-methyl - para - methylbenzyloxy) - tryptamine, 5-(alpha-cycloalkyl-halobenzyloxy)-tryptamines, e. g., 5-(alpha - cyclopentyl - para-chlorobenzyloxy)-tryptamine, 5-(dialkylbenzhydryloxy) - tryptamines, e. g., 5 - (para, para'-dimethylbenzhydryloxy)-tryptamine, 5-(dialkoxybenzhydryloxy)-tryptamine, e. g., 5-(para,para'-dimethoxybenzhydryloxy)-tryptamine, 5-(dicycloalkylbenzhydryloxy)-tryptamines, e. g., 5-(para,para'-dicyclohexylbenzhydryloxy) - tryptamine, 5 - (diaralkylbenzhydryloxy) - tryptamines, e. g., 5-(para,para'-dibenzylbenzhydryloxy)-tryptamine, and the like, and the hydrochlorides, hydrobromides, sulfates, acetates, citrates, tartrates, picrates, and the like acid addition salts thereof.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. In a process for the production of a 5-benzyloxytryptamine and acid addition salts thereof, the step of reducing the nitrile group of a 5-benzyloxy-3-indoleacetonitrile to an amine group with a reducing agent selected from the group consisting of metal hydrides and hydrogen in the presence of a hydrogenation catalyst.

2. In a process for the production of a 5-alkylbenzyloxytryptamine and acid addition salts thereof, the step of reducing the nitrile group of a 5-alkylbenzyloxy-3-indoleacetonitrile to an amine group with a reducing agent selected from the group consisting of metal hydrides and hydrogen in the presence of a hydrogenation catalyst.

3. In a process for the production of a 5-aralkylbenzyloxytryptamine and acid salts thereof, the step of reducing the nitrile group of a 5-aralkylbenzyloxy-3-indoleacetonitrile to an amine group with a reducing agent selected from the group consisting of metal hydrides and hydrogen in the presence of a hydrogenation catalyst.

4. In a process for the production of a 5-benzhydryloxytryptamine and acid addition salts thereof, the step of reducing the nitrile group of a 5-benzhydryloxy-3-indoleacetonitrile to an amine group with a reducing agent selected from the group consisting of metal hydrides and hydrogen in the presence of a hydrogenation catalyst.

5. In a process for the production of 5-benzyloxytryptamine and acid addition salts thereof, the step of reducing the nitrile group of 5-benzyloxy-3-indoleacetonitrile to an amine group with a reducing agent selected from the group consisting of metal hydrides and hydrogen in the presence of a hydrogenation catalyst.

6. In a process for the production of a 5-alkoxybenzyloxytryptamine and acid addition salts thereof, the step of reducing the nitrile group of a 5-alkoxybenzyloxy-3-indoleacetonitrile to an amine group with a reducing agent selected from the group consisting of metal hydrides and hydrogen in the presence of a hydrogenation catalyst.

7. A process for the preparation of a 5-benzyloxytryptamine and acid addition salts thereof, which comprises reacting a 5-benzyloxyindole with a Grignard reagent, reacting the resulting 5-benzyloxyindolemagnesium halide with a haloacetonitrile to yield a 5-benzyloxy-3-indoleacetonitrile, and reducing the nitrile group of the 5-benzyloxy-3-indoleacetonitrile with a reducing agent selected from the group consisting of metal hydrides and hydrogen in the presence of a hydrogenation catalyst to produce a 5-benzyloxytryptamine.

8. A process for the preparation of a 5-alkylbenzyloxytryptamine and acid addition salts thereof, which comprises reacting a 5-alkylbenzyloxyindole with a Grignard reagent, reacting the resulting 5-alkylbenzyloxyindolemagnesium halide with a haloacetonitrile to yield a 5-alkylbenzyloxy-3-indoleacetonitrile, and reducing the nitrile group of the 5-alkylbenzyloxy-3-indoleacetonitrile with a reducing agent selected from the group consisting of metal hydrides and hydrogen in the presence of a hydrogenation catalyst to produce a 5-alkylbenzyloxytryptamine.

9. A process for the preparation of a 5-aralkylbenzyloxytryptamine and acid addition salts thereof, which comprises reacting a 5-aralkylbenzyloxyindole with a Grignard reagent, reacting the resulting 5-aralkylbenzyloxyindolemagnesium halide with a haloacetonitrile to yield a 5-aralkylbenzyloxy-3-indoleacetonitrile, and reducing the nitrile group of the 5-aralkylbenzyloxy-3-indoleacetonitrile with a reducing agent selected from the group consisting of metal hydrides and hydrogen in the presence of a hydrogenation catalyst to produce a 5-aralkylbenzyloxytryptamine.

10. A process for the preparation of 5-benzyloxytryptamine and acid addition salts thereof, which comprises reacting 5-benzyloxyindole with a Grignard reagent, reacting the resulting 5-benzyloxyindolemagnesium halide with a haloacetonitrile to yield 5-benzyloxy-3-indoleacetonitrile, and reducing the nitrile group of 5-benzyloxy-3-indoleacetonitrile with a reducing agent selected from the group consisting of metal hydrides and hydrogen in the presence of a hydrogenation catalyst to produce 5-benzyloxytryptamine.

11. A process for the preparation of a 5-benzhydryloxytryptamine and acid addition salts thereof, which comprises reacting a 5-benzhydryloxyindole with a Grignard reagent, reacting the resulting 5-benzhydryloxyindolemagnesium halide with a haloacetonitrile to yield a 5-benzhydryloxy-3-indoleacetonitrile, and reducing the nitrile group of the 5-benzhydryloxy-3-indoleacetonitrile with a reducing agent selected from the group consisting of metal hydrides and hydrogen in the presence of a hydrogenation catalyst to produce a 5-benzhydryloxytryptamine.

12. A process for the preparation of a 5-alkoxybenzyloxytryptamine and acid addition salts thereof, which comprises reacting a 5-alkoxybenzyloxyindole with a Grignard reagent, reacting the resulting 5-alkoxybenzyloxyindolemagnesium halide with a haloacetonitrile to yield a 5-alkoxybenzyloxy-3-indoleacetonitrile, and reducing the nitrile group of the 5-alkoxybenzyloxy-3-indoleacetonitrile with a reducing agent selected from the group consisting of metal hydrides and hydrogen in the presence of a hydrogenation catalyst to produce a 5-alkoxybenzyloxytryptamine.

13. A member of the group consisting of 5-benzyloxytryptamines and acid addition salts thereof.

14. A 5-benzyloxytryptamine.

15. A 5-benzyloxytryptamine acid addition salt.
16. 5-benzhydryloxytryptamine.
17. A 5-alkylbenzyloxytryptamine.
18. 5-(para-methylbenzyloxy)-tryptamine.
19. A 5-aralkylbenzyloxytryptamine.
20. 5-(para-benzylbenzyloxy)-tryptamine.
21. 5-benzyloxytryptamine.
22. 5-benzyloxytryptamine hydrochloride.
23. A 5-alkoxybenzyloxytryptamine.
24. 5-(para-methoxybenzyloxy)-tryptamine.

References Cited in the file of this patent

Wieland et al.: Annalen der Chemie, Band 513, pp. 1–25.

Burton et al.: J. Chem. Soc., 1937, pp. 1726–8.